US008147233B2

(12) United States Patent
Morey et al.

(10) Patent No.: US 8,147,233 B2

(45) Date of Patent: Apr. 3, 2012

(54) APPARATUS FOR HIGHLY CONTROLLED COLOR DISTRIBUTION IN MASS PRODUCED CONCRETE PRODUCTS

(75) Inventors: Matthew K. Morey, Menlo Park, CA (US); James Grossi, Gustine, CA (US); Robert Van Baarsel, Wassenaar (NL); Arjan Kemp, Hengelo (NL); Bernhard Veerkamp, Spelle (DE)

(73) Assignees: Calstone, Sunnyvale, CA (US); Rekers GmbH Maschinen-und Anlagenbau, Spelle (DE)

( * ) Notice: Subject to any disclaimer, the term of this patent is extended or adjusted under 35 U.S.C. 154(b) by 0 days.

(21) Appl. No.: 12/538,848

(22) Filed: Aug. 10, 2009

(65) Prior Publication Data

US 2009/0316515 A1 Dec. 24, 2009

Related U.S. Application Data

(63) Continuation of application No. 11/111,656, filed on Apr. 21, 2005, now Pat. No. 7,572,048.

(51) Int. Cl.
*B29C 43/34* (2006.01)

(52) U.S. Cl. ........ 425/130; 425/134; 425/257; 425/258; 425/260; 425/448

(58) Field of Classification Search .................. 425/130, 425/134, 257, 258, 260, 448; 366/8, 16, 366/41, 152.1, 153.2
See application file for complete search history.

(56) References Cited

U.S. PATENT DOCUMENTS 3,216,464 A 11/1965 Horst
4,265,609 A 5/1981 Kitahara
5,056,998 A * 10/1991 Goossens ...................... 425/130
2003/0198122 A1* 10/2003 Johnson ............................ 366/2

FOREIGN PATENT DOCUMENTS

EP 0940235 A2 9/1999

OTHER PUBLICATIONS

Restriction Requirement dated Jul. 24, 2006 in U.S. Appl. No. 11/111,656.
Response to Office Action filed Nov. 21, 2006 in U.S. Appl. No. 11/111,656.
Notice of Non-Compliant Amendment dated Dec. 1, 2006 in U.S. Appl. No. 11/111,656.
Response to Office Action filed Dec. 28, 2006 in U.S. Appl. No. 11/111,656.
Notice of Non-Compliant Amendment dated Mar. 19, 2007 in U.S. Appl. No. 11/111,656.
Response to Office Action filed Apr. 12, 2007 in U.S. Appl. No. 11/111,656.
Office Action dated Jun. 13, 2007 in U.S. Appl. No. 11/111,656.
Response to Office Action filed Oct. 15, 2007 in U.S. Appl. No. 11/111,656.
Office Action dated Dec. 28, 2007 in U.S. Appl. No. 11/111,656.

(Continued)

*Primary Examiner* — Yogendra Gupta
*Assistant Examiner* — Joseph Leyson
(74) *Attorney, Agent, or Firm* — Vierra Magen Marcus & DeNiro LLP

(57) ABSTRACT

An apparatus for highly controlled color composition and distribution within the face mix of semi-dry concrete mix paving stones.

9 Claims, 10 Drawing Sheets

OTHER PUBLICATIONS

Response to Office Action filed Mar. 28, 2008 in U.S. Appl. No. 11/111,656.

Advisory Action dated Apr. 8, 2008 in U.S. Appl. No. 11/111,656.

Response to Office Action filed Jun. 30, 2008 in U.S. Appl. No. 11/111,656.

Office Action dated Sep. 18, 2008 in U.S. Appl. No. 11/111,656.

Response to Office Action filed Feb. 18, 2009 in U.S. Appl. No. 11/111,656.

European Search Report dated Feb. 24, 2010 in European Application No. 06758557.0.

English translation of Abstract of EP0940235 published Sep. 8, 1999.

European Supplementary Search Report dated Mar. 4, 2010 for European Patent Application No. 06758557.0.

Response to Official Letter filed Dec. 31, 2010 in European Patent Application No. 06758557.0.

Summons to Oral Proceedings at the EPO date May 26, 2011 in European Patent Application No. 06758557.0.

Petition filed Oct. 5, 2011 in European Patent Application No. 06758557.0.

* cited by examiner

Time $t_1$

Time $t_2$

Time $t_3$

Time $t_4$

Time $t_5$

Time $t_6$

Time $t_1$

Time $t_2$

Time $t_3$

APPARATUS FOR HIGHLY CONTROLLED COLOR DISTRIBUTION IN MASS PRODUCED CONCRETE PRODUCTS

CROSS REFERENCE TO RELATED APPLICATION

This application is a continuation of U.S. patent application Ser. No. 11/111,656, entitled "METHOD AND APPARATUS FOR HIGHLY CONTROLLED COLOR DISTRIBUTION IN MASS PRODUCED CONCRETE PRODUCTS," filed on Apr. 21, 2005, now U.S. Pat. No. 7,572,048.

BACKGROUND OF THE INVENTION

1. Field of the Invention

The present invention relates to the mass production of concrete products such as paving stones, slabs, retaining wall units and all types of blocks, and in particular to methods and apparatus for highly controlled color distribution and blending within the face mix of concrete paving stones, but not limited to these.

2. Description of the Related Art

Natural stone has long been an attractive material for use in hardscape and masonry construction. However, owing to the high cost of natural stone, it is known to mix pigmented semi-dry concrete mixes in a mold to form a wide range of products, and in particular those often referred to as paving stones, that emulate the appearance and texture of natural stone. Such paving stones, an example of which is shown at 10 in FIG. 1, include a first "coarse mix" layer 12 made of a coarse semi-dry concrete mix having good structural properties, and a second "face mix" layer 14 which is visible as the upper surface in the finished product, and ideally has a mottled and random colored appearance approximating that of natural stone. The coarse mix layer is typically about 60 mm to 100 mm thick, and the face mix layer is typically about 5 mm to 8 mm thick.

A conventional machine 20 for mass producing paving stones is shown in FIG. 2. In general, the paving stones are formed in a plurality of molds 22 which pass through a loading zone 24 where the coarse mix and face mix are gravity fed in successive layers into the mold and packed down with a tamper and assisted by vertical vibration 26 to form the finished paving stones. Each mold has dividers to divide the coarse and face mix into the desired number and shape of paving stones within the mold.

On the coarse mix side 28, the semi-dry concrete and color pigment that form the semi-dry concrete mix are loaded into a large hopper 30. Hopper 30 supplies the coarse mix to a feedbox 32, which is mounted for horizontal travel between a first position under the hopper 30 where it receives the coarse mix and a second position over the mold 22 to be filled within the loading zone.

The structures on the face mix side 34 in conventional color blending machines generally mirror the structures on the coarse mix side. One or more hoppers 36 containing semi-dry concrete mix of differing colors supply a feedbox 38, which is mounted for horizontal travel between a first position under the face mix hopper and a second position over the mold to be filled in the loading zone. The face mix feedbox 38 travels into position and loads the face mix after the coarse mix feedbox 32 has loaded the coarse mix. The tamper then compacts the semi-dry concrete mix in the mold with the assistance of vertical vibration from the table under the mold and then the compacted product is ejected from the mold on to the production board and transported to the curing area where it hardens within a typical time of 24 hours.

It is desirable to replicate the dappled and random coloring of natural stone as closely as possible in each paving stone within a mold, and across a plurality of molds. This difficulty has not been adequately addressed in a cost effective prior art solution.

It is known to premix various colored semi-dry concrete mixes in the hopper prior to introduction of the mix into the feedbox. For example, the hopper may include stationary or movable gates for directing the inlet flow of each colored semi-dry concrete mix to one side or another of the hopper. U.S. Pat. No. 6,461,552 discloses a hopper having horizontal baffles. Concrete mixes of different colors are initially layered on top of a baffle. As the baffle is laterally withdrawn, the respective layers blend as they fall to the bottom of the hopper.

Such prior art solutions provide very little control over the degree of blending of the different colored semi-dry concrete mixes, and do not supply face mix to the feedbox in a manner that the feedbox then evenly distributes the different colors to give the desired dappled and random colored appearance.

Blending also takes place within the feedbox after transfer from the hopper. However, a further typical problem on the face mix side is that the semi-dry mix remains in the feedbox for to many production cycles and gets agitated to the point of becoming a homogeneous color. Face mix feedboxes are generally the same size as the coarse mix feedboxes. Each coarse mix feedbox typically holds enough coarse mix to fill two molds before it needs to be refilled. However, as each paving stone is made up of predominantly coarse mix, the face mix feedbox empties much more slowly, and it is common for a given supply of face mix to remain in the feedbox for twenty or so cycles before it needs to be refilled. Remaining in the feedbox for this many cycles, whatever distinct colors were initially loaded into the feedbox tend to mix with each other and become a homogeneous color as the face mix feedbox jostles back and forth over successive molds. Thus, the desired dappled, many colored appearance of the paving stones is lost.

U.S. Pat. No. 6,382,947 attempts to control the makeup of the concrete mix in the feedbox by providing three separate hoppers over the feedbox, each having a distinct colored semi-dry concrete mix. The feedbox is loaded as it passes beneath the respective hoppers. This solution tends to layer the colored semi-dry concrete mix in the feedbox, and still does not provide any significant control over the composition and distribution of the concrete color blend in the feedbox. Moreover, loading the feedbox from three separate hoppers is time consuming.

A further shortcoming of the prior art is shown in FIG. 2A. In conventional color blending machines having relatively large face mix feedboxes, the entire face mix feedbox passes over the portion of the mold nearest the face mix feedbox, and this nearest portion receives colored semi-dry concrete mix from the entire feedbox. However, the sweep of the feedbox over the mold continues only until the far edge of the feedbox reaches the far end of the mold, at which point the feedbox returns. As conventional feedboxes are relatively large, the portion of the mold farthest from the face mix feedbox only receives semi-dry concrete mix from a portion of the feedbox. Semi-dry concrete mix from a portion of the feedbox above the arrows in FIG. 2A never reaches the farthest portion of the mold. Thus, paving stones from the farthest portion of the mold tend to have a different appearance than paving stones from other portions of the mold.

It would thus be advantageous to precisely control the face mix color composition and distribution loaded into a mold to evenly distribute the semi-dry concrete mix, and to provide colors in each paving stone in a controlled percentage and in the dappled and random coloring of natural stone.

SUMMARY OF THE INVENTION

Embodiments of the present invention relate to methods and apparatus for highly controlled color composition and distribution within the face mix of semi-dry concrete paving stones and other afore mentioned mass produced concrete products.

BRIEF DESCRIPTION OF THE DRAWINGS

Embodiments of the present invention will now be described with reference to the drawings in which.

DETAILED DESCRIPTION

The present invention will now be described with reference to FIGS. 3 through 10C, which in embodiments of the invention relate to methods and apparatus for highly controlled color composition and distribution within the face mix of semi-dry concrete mix paving stones. It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 3:
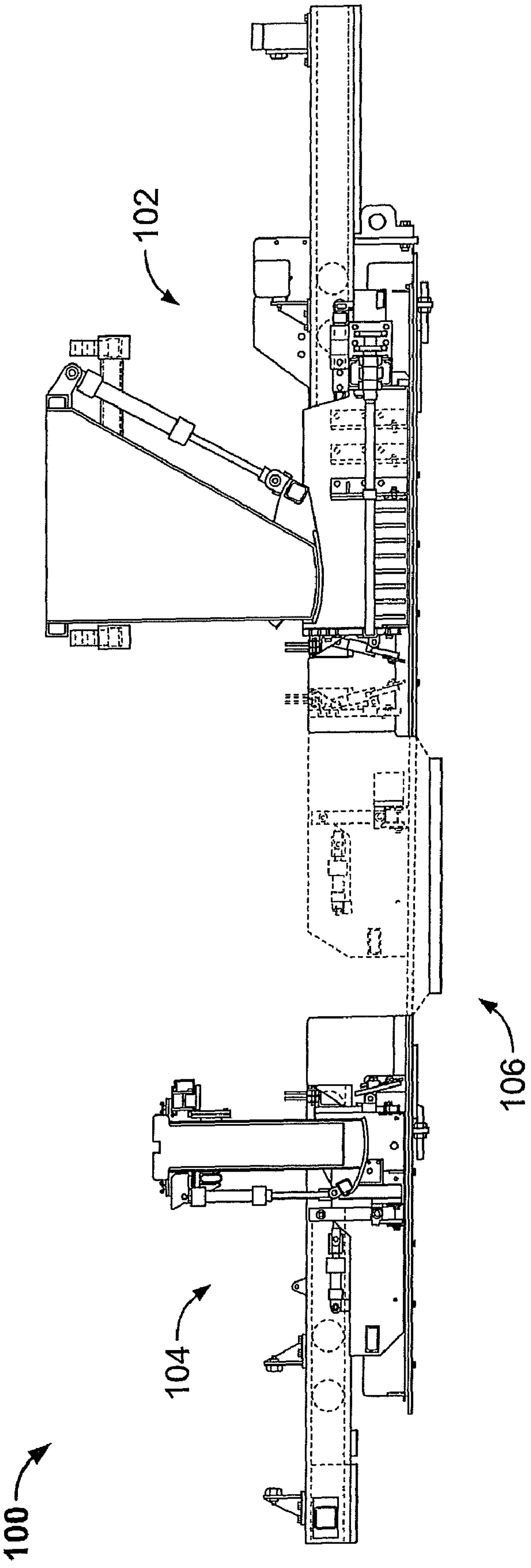
FIG. 3 is a front view of a color blending machine including a face mix side according to the present invention.

Referring now FIG. 3, there is shown a front view of a color blending apparatus 100 according to the present invention. Apparatus 100 includes a coarse mix side 102 and a face mix side 104 for supplying semi-dry concrete mix to molds in a loading zone 106. The present invention relates to methods and apparatus on a face mix side 104, and it is understood that the coarse mix side 102 may include any of various known components for producing coarse mix semi-dry concrete mix known in the art.

Figure 4:
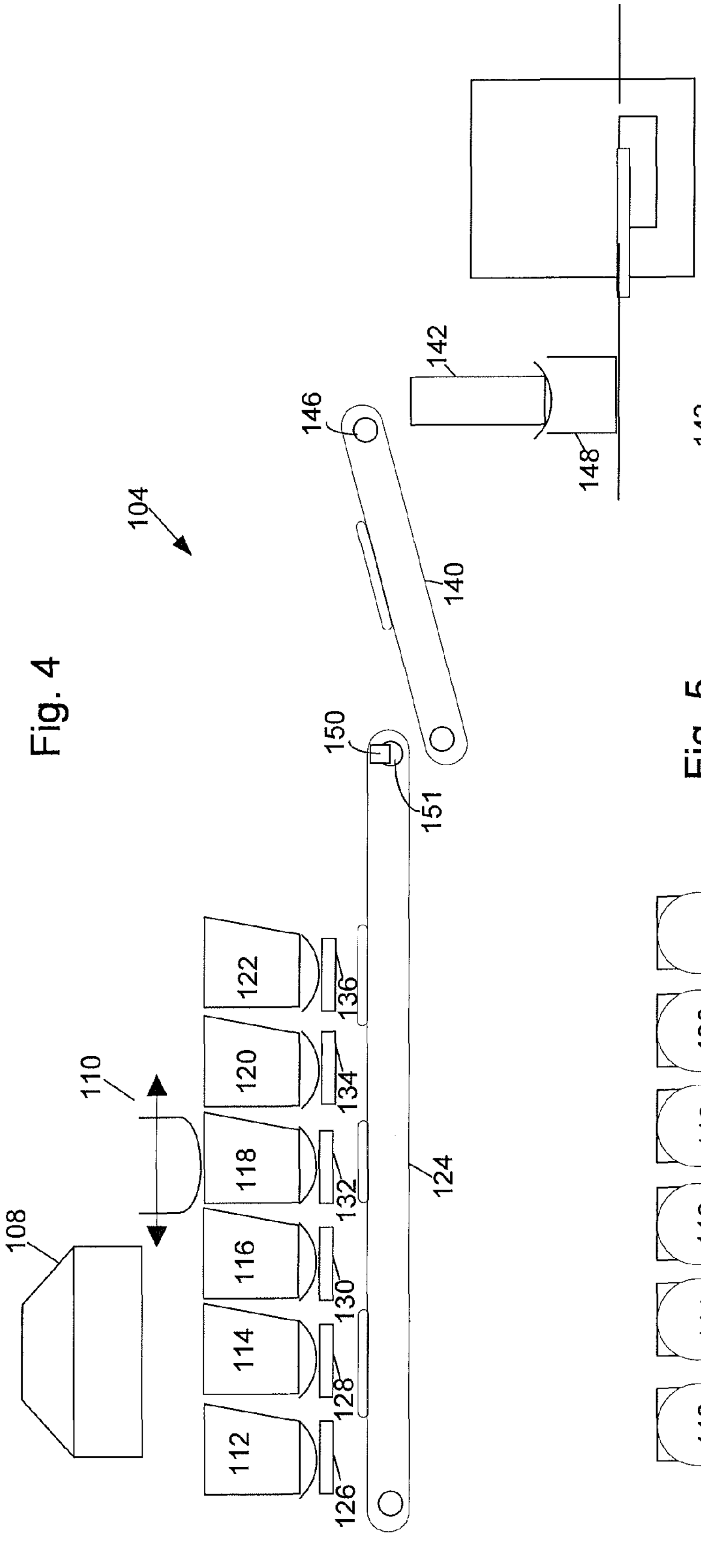
FIG. 4 is a front view of the face mix side according to the embodiments of the present invention.
Figure 5:
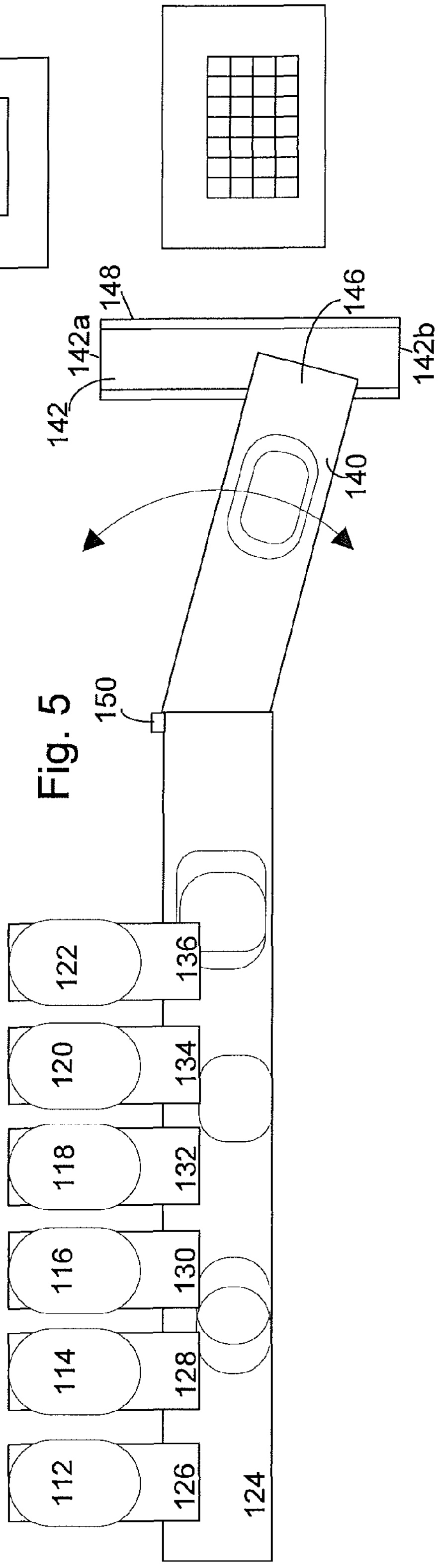
FIG. 5 is a top view of the face mix side according to the embodiments of the present invention.

FIGS. 4 and 5 show a front view and a top view, respectively, of the face mix side 104 of color blending machine 100. There is shown a face mixer 108 for mixing semi-dry concrete mix. Although not critical to the present invention, semi-dry concrete mix may include cement, a color pigment generally in the form of various iron oxides, sand and rock aggregate in the form of crushed stone chips or relatively small rocks together with water. Face mixer 108 creates a semi-dry concrete mix of a given color, and transfers the semi-dry concrete mix to a distribution bucket 110 which in turn delivers a given batch of semi-dry concrete mix into one of a plurality of dosing hoppers 112 through 122, respectively. Distribution bucket 110 may be mounted for travel as is known in the art to receive a batch of semi-dry concrete mix from face mixer 108 and selectively transfer the batch under the control of a computer control system to one or more of the desired dosing hoppers 112 through 122. Dosing hoppers 112 through 122 receive colored semi-dry concrete mix from face mixer 108 and dispense the semi-dry concrete mix onto a collection conveyer 124 as explained hereinafter.

While six dosing hoppers are shown in the figures, it is understood that the present invention may operate with more or less dosing hoppers in alternative embodiments. In embodiments of the invention, each dosing hopper 112 through 122 receives a different color semi-dry concrete mix for face mixer 108. However, it is understood that more than one of the dosing hoppers 112 through 122 may have the same color in alternative embodiments, and it is understood that one or more of the dosing hoppers may go unused during a given paving stone production run. In an embodiment of the invention, each dosing hopper 112 through 122 may be similar in shape and may hold a suitable volume of semi-dry concrete mix that is about 400 liters in the afore mentioned example. However, it is understood that the dosing hoppers may hold more or less than 400 liters, may have different shapes than each other, and may hold more or less than each other in alternative embodiments.

Each dosing hopper 112 through 122 may include a load cell for measuring by weight the amount of semi-dry concrete mix remaining within a dosing hopper. Knowing the amount of semi-dry concrete mix within a particular dosing hopper and knowing the rate at which semi-dry concrete mix is being drawn from a dosing hopper (as explained hereinafter), the computer control system can determine in advance when a particular dosing hopper needs a new batch of color semi-dry concrete mix so that the new batch may be mixed in face mixer 108 and supplied to that dosing hopper before that dosing hopper runs out of semi-dry concrete mix. Thus, the supply of semi-dry concrete mix in each dosing hopper 112 through 122 used in a particular process is continuously replenished from face mixer 108 as needed.

Each dosing hopper 112 through 122 may be open at it bottom and lie close to its associated dosing belt 126 through 136. When a dosing belt is rotated, semi-dry concrete mix from the associated dosing hopper is drawn from the hopper onto the belt. When a belt remains stationary, no concrete mix is drawn from the associated hopper. In an alternative embodiment, a clam shell or other type of gate may be provided at the lower surface of each dosing hopper. In such embodiments, the gate can be operated by electric motor or otherwise to supply a desired amount of semi-dry concrete mix mixture onto dosing belts 126 through 136 associated with each of the dosing hoppers 112 through 122, respectively. Dosing belts 126 though 136 in turn deliver semi-dry concrete mix onto collection conveyor 124. The length of the collection conveyor 124 may vary in alternative embodiments, but may be for example 10 meters.

In embodiments, each of the dosing hoppers 112 through 122 may be aligned next to each other in a row for easy access by distribution bucket 110. Each of the dosing belts 126 through 136 may be similarly aligned in parallel relation to each other and generally perpendicular to the direction of travel of collection conveyor 124 to deliver semi-dry concrete mix between the dosing hoppers and collection conveyor 124. It is understood that the dosing hoppers and belts need not be aligned next to each other in alternative embodiments, and the belts need not be generally parallel to each other and perpendicular to collection conveyor 124 in alternative embodiments.

The dosing hoppers 112 through 122 may be spaced approximately 2 meters from the collection conveyor 124 (centerline to centerline), and the dosing belts 126 through 136 sized accordingly. It is understood that the distance between the dosing hoppers and the conveyor may vary in alternative embodiments. Similarly, it is contemplated that the dosing hoppers 112 through 122 may be positioned directly over the collection conveyor 124 so as to deposit their semi-dry concrete mix supply directly onto collection conveyor 124. In such embodiments, dosing belts 126 through 136 may be omitted.

Face mix side 104 in embodiments of the present invention further includes a swivel conveyor 140 for receiving semi-dry concrete mix from collection conveyor 124 and depositing it within a face mix hopper 142, described in greater detail below. In embodiments of the invention, swivel conveyor 140 is mounted on a pivot assembly (not shown) of known construction capable of pivoting an end 146 of swivel conveyor 140 across the width of face mix hopper 142 between the first end 142*a* and a second end 142*b* of the face mix hopper 142. The pivot assembly pivots the swivel conveyor 140 in accordance with positioning control from the computer control system based on feedback from a pair of optical sensors 150, 152 explained hereinafter.

Swivel conveyor 140 is shown at an incline in the drawings, of for example 13°, but it understood that swivel conveyor 140 may have the upward slope shown, a downward slope, or be horizontal, as long as the end of swivel conveyor 140 adjacent the face mix hopper 142 is at an elevation high enough to deliver the semi-dry concrete mix from the swivel conveyor 140 into the face mix 142. The length of the swivel conveyor 140 may vary in alternative embodiments, but may be for example 5 meters.

Conveyors 124 and 140 may each be formed of a single continuous belt driven to rotate at a controlled speed in a continuous loop under the control of the computer control system. In embodiments of the invention, each conveyor may be approximately 600 mm wide. It is understood that each conveyor 124, 140 may in turn be made up of more than one conveyor. Moreover, conveyors other than belt-type conveyors may be used to transport the semi-dry concrete mix from the dosing hoppers to the face mix hopper in alternative embodiments.

Face mix hopper 142 is preferably smaller than conventional hoppers that supply semi-dry concrete mix to a feedbox. In an embodiment of the invention, face mix hopper 142 may be approximately 800 mm tall, 250 mm wide, and about 1000 mm long. Thus, the volume of face mix hopper 142 is roughly about 1/10 that of conventional hoppers. It is understood that the dimensions and the volume of face mix hopper 142 may be greater or lesser than that in alternative embodiments of the present invention.

Figure 6A:
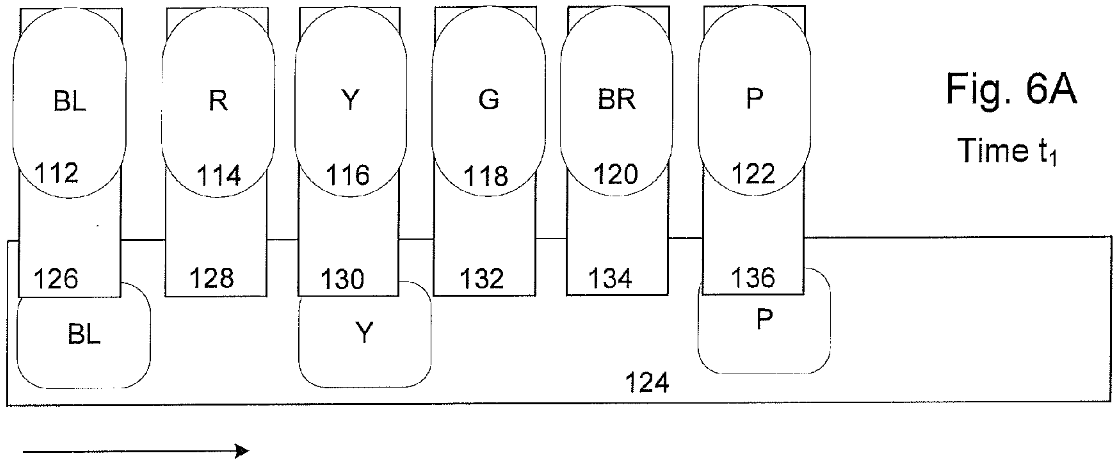
FIGS. 6A through 6C illustrate top views of semi-dry concrete mix being deposited on a collection conveyor at three different times according to one example of an embodiment of the present invention.

The operation of the present invention to precisely control the composition and distribution of various colored semi-dry concrete mixes within face mix hopper 142 will now be described with respect to FIGS. 6A through 7C. In the embodiments shown, dosing hoppers 112 through 122 may include black, red, yellow, green, brown, and purple colored semi-dry concrete mixes. It is understood that these colors are merely exemplary and other colors may be used in different orders. Referring first to FIG. 6A the system control of color blend machine 100 may be directed to initially dispatch a portion of black, yellow, and purple semi-dry concrete mix on collection conveyor 124 as shown at a time $T_1$. In particular, the computer control system may run dosing belts 126, 130 and 136 to dispense a portion of semi-dry concrete mix onto collection conveyor 124 as shown in FIG. 6A.

Figure 6B:
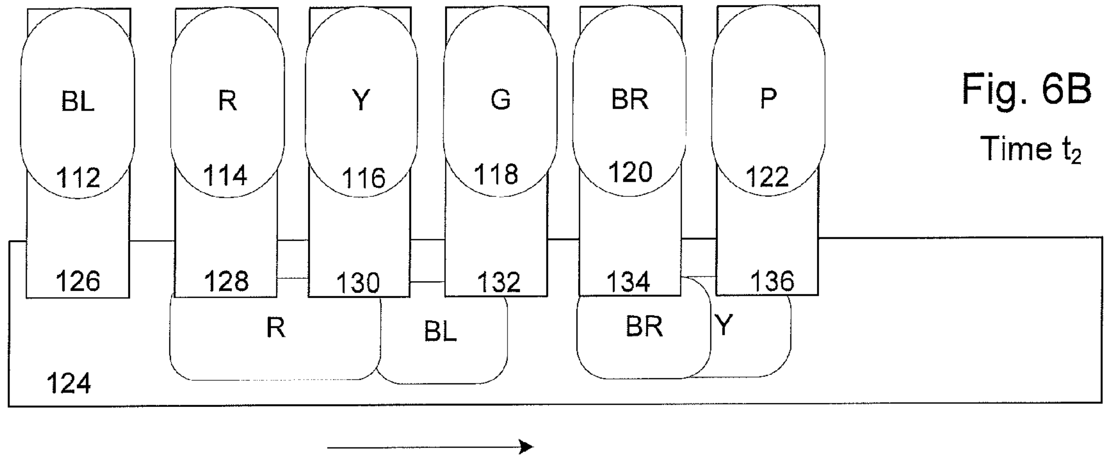
Figure 6C:
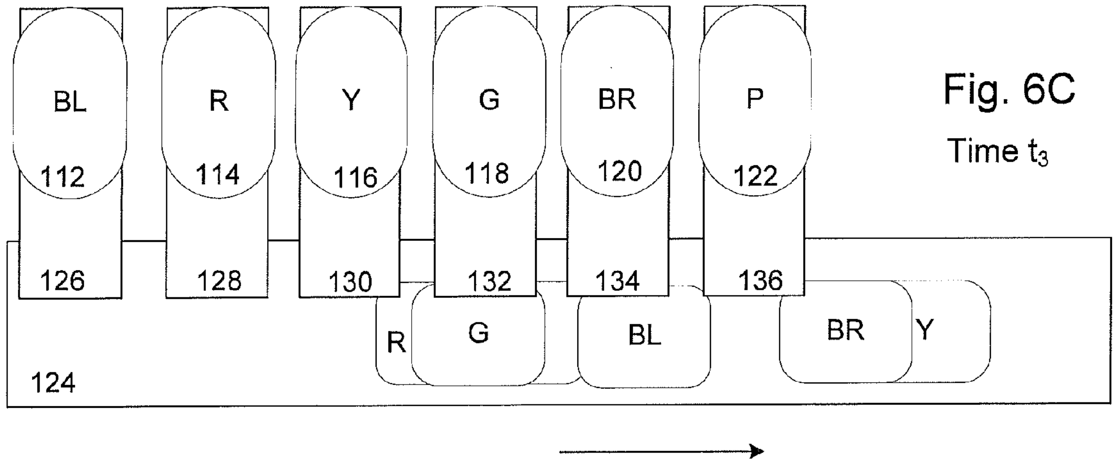

At a time $T_2$ shown in FIG. 6B, the purple semi-dry mix has left collection conveyor 124. Additional semi-dry concrete mix is shown having been delivered onto collection conveyor 124. In this example, dosing hopper 120 has dispensed a portion of brown semi-dry concrete mix and dosing hopper 114 has dispensed a portion of red semi-dry concrete mix on collection conveyor 124.

The speed with which collection conveyor 124 advances the semi-dry concrete mix is known and controlled by the computer control system. Thus, the position of each colored semi-dry concrete mix on collection conveyor 124 is known as a function of the initial position at which it is dispensed onto collection conveyor 124, the speed of collection conveyor 124, and the length of time a portion of semi-dry concrete mix has been on collection conveyor 124.

Thus, as shown in FIG. 6B, additional semi-dry concrete mixes may be added to collection conveyor 124 in any desired relation to the colored semi-dry concrete mixes dispensed onto the conveyor at time $T_1$ shown in FIG. 6A. In the example shown in FIG. 6B, a portion of brown semi-dry concrete mix has been added to overlap the yellow semi-dry concrete mix dispensed at time $T_1$. Similarly, red semi-dry concrete mix has been dispensed to lie adjacent to the black semi-dry concrete mix dispensed at time $T_1$. It is also possible with the present invention to dispense a greater or lesser amount of semi-dry concrete mix from the dosing hoppers onto collection conveyor 124. For example, FIG. 6B shows that there is a greater amount of red semi-dry concrete mix dispensed on collection conveyor 124 than the brown semi-dry concrete mix. This is accomplished by the computer control system by running dosing belt 128 for a longer period of time than dosing belt 134.

As indicated, the above relations of the different colored semi-dry concrete mixes shown in FIG. 6B are merely exemplary and it will be understood that a variety of additional and/or other combinations may be provided. For example, in FIG. 6C, it is further shown that a portion of green semi-dry concrete mix is dispensed at a time $T_3$ directly on top of the red semi-dry concrete mix lying adjacent to the black semi-dry concrete mix.

The computer control system is able to place different colored semi-dry concrete mixes on collection conveyor 124 in a desired quantity and known relation to other colored semi-dry mixes. To aid in this process and to provide closed loop servo control, embodiments of the present invention further include an encoder 150 capable of sensing speed and translation of conveyor 124. Encoders for this purpose are known in the art, but in one embodiment, encoder 150 may be an optical encoder, including a plurality of flags mounted on pulley 151 of collection conveyor 124, and an optical sensor capable of detecting the passage of a flag as pulley 151 rotates. Thus, both the speed of collection conveyor 124 and the amount of translation of material on conveyor 124 may be controlled by the system control computer in combination with feedback from encoder 150.

As indicated above, semi-dry concrete mix deposited on collection conveyor 124 is subsequently transferred to swivel conveyor 140. By controlling the speed and amount of translation of each of dosing belts 126-136 and collection conveyor 124 as described above, the position of the respective colored concrete mix on collection conveyor 124, as well as on swivel conveyor 140, is known. Swivel conveyor 140 may optionally have an encoder as described above in embodiments of the invention.

Figure 7A:
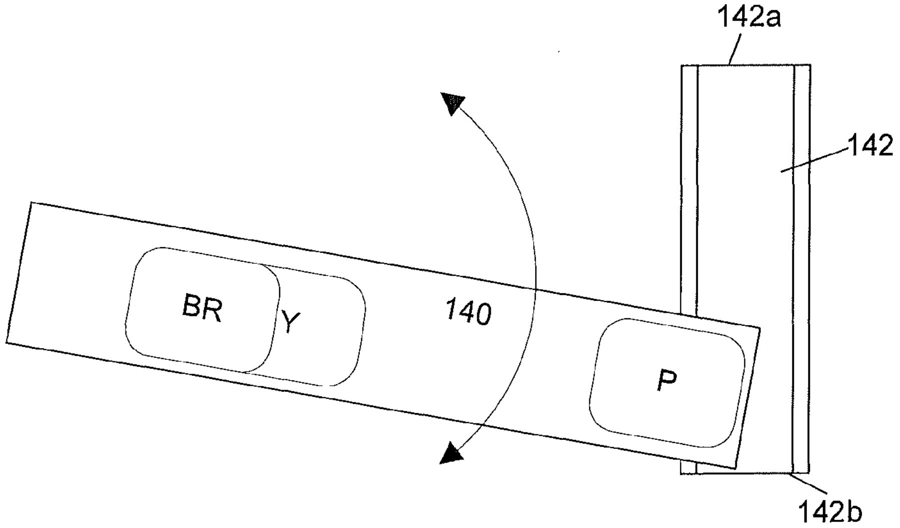
FIGS. 7A through 7C illustrate semi-dry concrete mix being conveyed from a swivel conveyor into a face mix hopper according to the present invention at three different times.
Figure 7B:
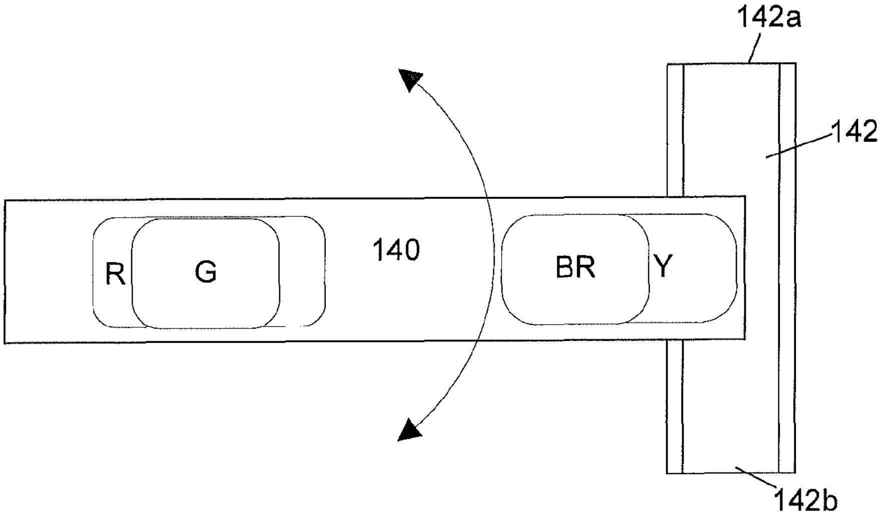
Figure 7C:
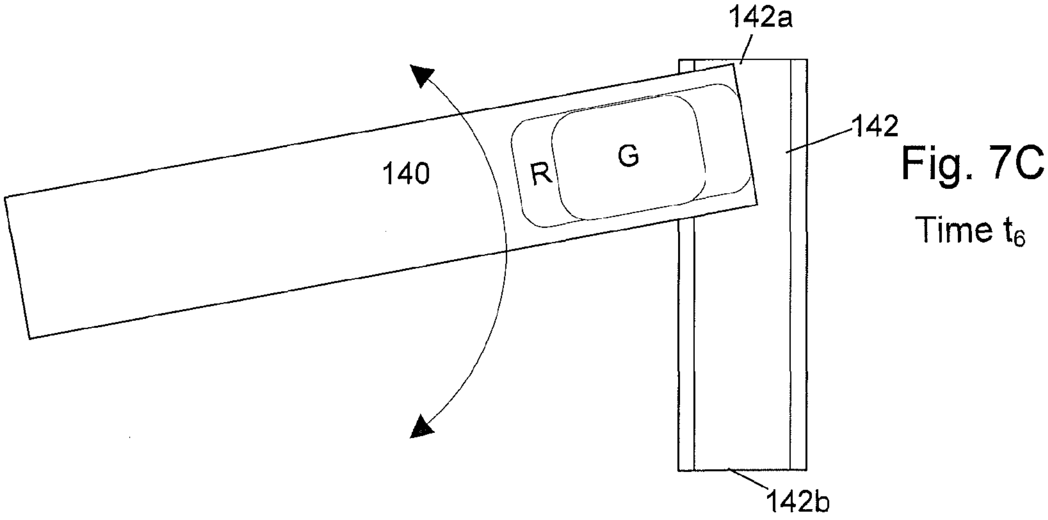

Referring now to FIGS. 7A through 7C, the various colored semi-dry concrete mixes deposited on swivel conveyor 140 from collection conveyor 124 may be deposited in the desired position within face mix hopper 142. In particular, in following the example set forth in FIGS. 6A through 6C, it may be desired to deposit the purple semi-dry concrete mix adjacent side 142*b* of face mix hopper 142. Thus, as shown in FIG. 7A, when the purple semi-dry concrete mix is about to be deposited into face mix hopper 142 from swivel conveyor 140 at time $T_4$, the system control has swivel conveyor 140 to the bottom-most position (with reference to the drawing) so that the purple semi-dry mix will be deposited as desired. Similarly, the computer control system may be programmed so that the brown and yellow overlapping semi-dry concrete mix is deposited near a middle of face mix hopper 142 at a time $T_5$ as shown FIG. 7B. FIG. 7C shows swivel conveyor 140 pivoted to an extreme side position to deposit the red and green semi-dry mix at a side 142*a* of face mix hopper 142 at a time $T_6$ in accordance with software instructions provided to the computer control system.

Although only three positions are shown in FIGS. 7A through 7C at which swivel conveyor 140 deposits semi-dry concrete mix into face mix hopper 142, it is understood that the pivot position of swivel conveyor 140 may be controlled to deposit concrete mix at any desired position between sides 142*a* and 142*b* of face mix hopper 142. Moreover, while the conveyor is located adjacent a front of the face mix hopper and pivots to deposit semi-dry concrete mix across a width of the face mix hopper, it is understood that the conveyor may instead be positioned 90° from the position shown in the figures so that it is positioned at a side of the face mix hopper. In such embodiments, instead of pivoting, the swivel conveyor 140 may be mounted for translation between a first position where it deposits semi-dry mix at side 142*a* of the face mix hopper 142, a second position where it deposits semi-dry mix at side 142*b* of the face mix hopper 142, and all positions between sides 142*a* and 142*b*.

As indicated above, the colors, amounts, and relative positions of the various semi-dry concrete mixes may be controllably varied as desired upon user input in the system controller. Discrete amounts of semi-dry concrete mix are shown in the figures (i.e., sections of semi-dry concrete mix separated by spaces of no semi-dry concrete mix). It is however understood that a continuous stream of semi-dry concrete mix may be deposited from the dosing hoppers onto the conveyors 124 and 140 in desired amounts and relative positions, and then deposited into face mix hopper 142 in the desired position across face mix hopper 142 (i.e., between ends 142*a* and 142*b*) as desired.

Figure 5A:
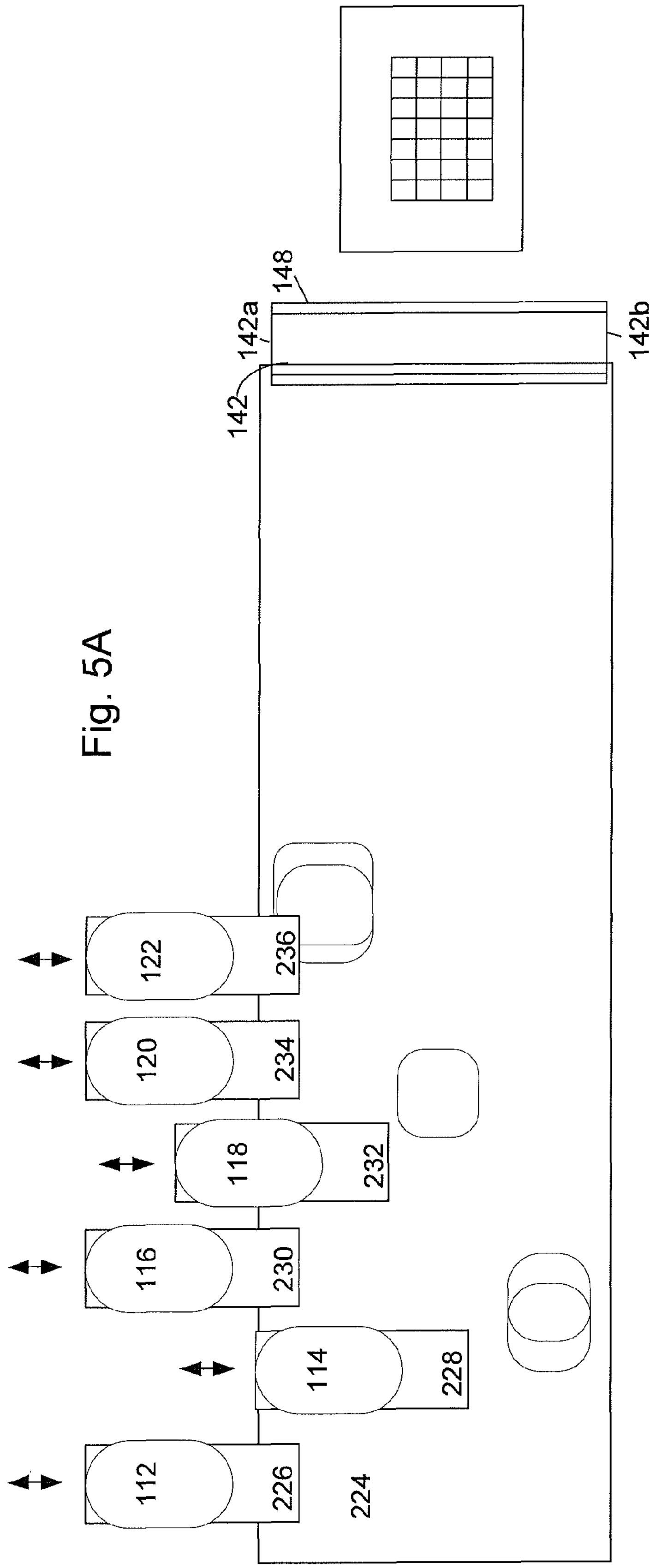
FIG. 5A is a top view of the face mix side according to an alternative embodiment of the present invention.

As described, collection conveyor 124 is relatively narrow (less than a meter in embodiments), and the swivel conveyor 140 then distributes the semi-dry concrete mix laterally across feed hopper 142 in a controlled manner. In an alternative embodiment, swivel conveyor 140 may be omitted. Such an embodiment is explained with respect to FIG. 5A. In the embodiment of FIG. 5A, conveyor 224 may be made wider, at least as wide as hopper 142. Each of dosing belts 226-236 in this embodiment is mounted for translation (in addition to rotation) in a known manner in a direction substantially transverse to the direction of collection conveyor 224. The belts 226-236 need not be perpendicular to conveyor 224, provided the belts 226-236 translate sufficiently to deposit semi-dry concrete mix across the width of collection conveyor 224.

In the embodiment of FIG. 5A, the translation of the dosing belts 226-236 and rotation of the dosing belts 226-236 and 224 is controlled to allow the distribution of semi-dry concrete mix in face mix hopper 142 in the desired amounts and distribution.

The face mix hopper 142 and face mix feedbox 148 will now be described with reference to FIGS. 4, 8 and 9. The face mix hopper 142 may include one or more dividers 160 which extend vertically down into the interior of the face mix hopper to provide barriers that limit mixing within the face mix hopper. The dividers may extend down across the entire height of the face mix hopper, or the dividers may extend down only part way so that a given divider inhibits mixing between two adjacent boundary areas over the length of the divider, but does not inhibit mixing between boundary areas at elevations below its length. Dividers may also have holes along their length through which mixing may occur between adjacent boundary areas. It is understood that different dividers may have different lengths. It is also understood that the number of dividers may vary in alternative embodiments, and that in embodiments, the dividers may be omitted altogether.

The face mix hopper 142 may include a load cell (not shown), probes, optical sensors or other indicator(s) to indicate the amount of semi-dry concrete mix within the face mix hopper at a given time. The face mix hopper load cell, together with the known rate of transfer of the semi-dry concrete mix from the swivel conveyor 140, may be used to signal the computer control system that it is time to refill the face mix hopper 142. The operations of dosing hoppers 112-122, dosing belts 126-136, collection conveyor 124 and swivel conveyor 140 may each be independently sped up or slowed down by the computer control system based in part on the feedback from the face mix hopper load cell to ensure the face mix hopper 142 has the right amount of semi-dry concrete mix for the face mix feedbox 148.

For example, where semi-dry concrete mix is being drawn slowly from the face mix hopper 142, the computer control system may wait until the face mix hopper 142 is 10% filled before signaling the upstream components to refill the face mix hopper 142. Where the semi-dry concrete mix is being drawing quickly from the face mix hopper 142, the computer control system may wait until the face mix hopper 142 is 50% filled before signaling the upstream components to refill the face mix hopper 142. In embodiments (both for slow and fast draw of concrete mix from the face mix hopper 142), the process may be controlled so that the upstream components supply concrete mix at a discontinuous rate (only when needed) or at a relative continuous rate.

If at any point in the process, a load cell or other indicator expects a supply of semi-dry concrete mix, but does not receive it within an expected period of time, the computer control system may sound an alarm and shut down the process.

Semi-dry concrete mix is loaded from the face mix hopper 142 into the face mix feedbox 148 under the force of gravity by operation of a gate 170 at the bottom of face mix hopper 142. The gate 170 may be operated by drive 172 which may be pneumatically driven under the control of the computer control system. It is understood that gate 170 may be actuated by other drive mechanisms in alternative embodiments. Gate 170 may alternatively be a clamshell gate where two halves are actuated away from each other to allow the semi-dry concrete mix to pass there through into the face mix hopper 142. Upon each actuation of gate 170, a layer of semi-dry concrete mix from the face mix hopper passes into the feedbox. Some desirable degree of blending takes place as the semi-dry concrete mix passes from the face mix hopper into the feedbox.

Face mix hopper 142 has a configuration and size not found in the prior art. This configuration and size both provide an advantageous level of control over the composition of concrete mix deposited in the feedbox also not found in the prior art.

Figure 1:
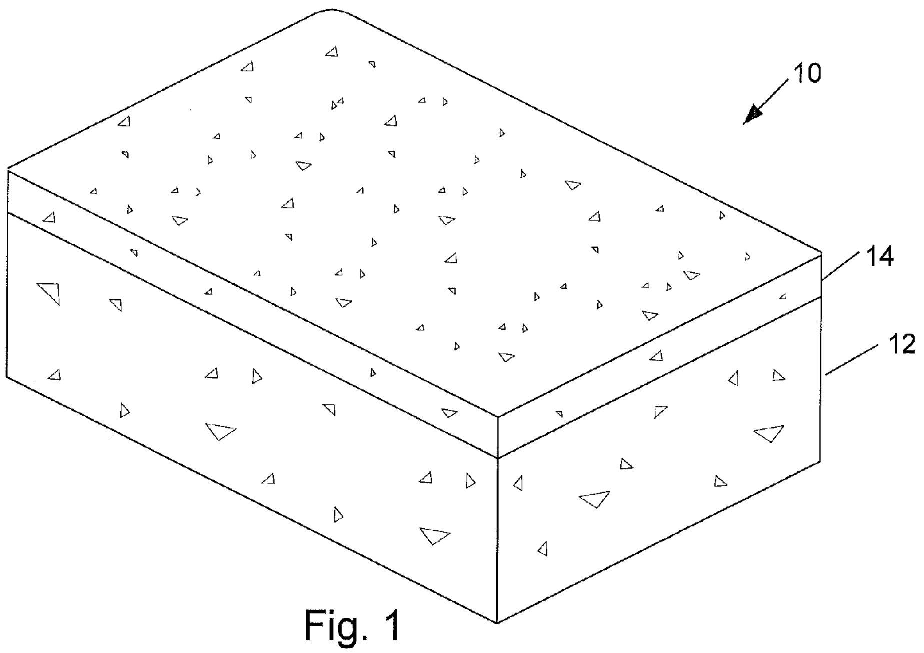
Fig. 1 (Prior Art)
FIG. 1 is a prior art illustration of a conventional paving stone.
Figure 2:
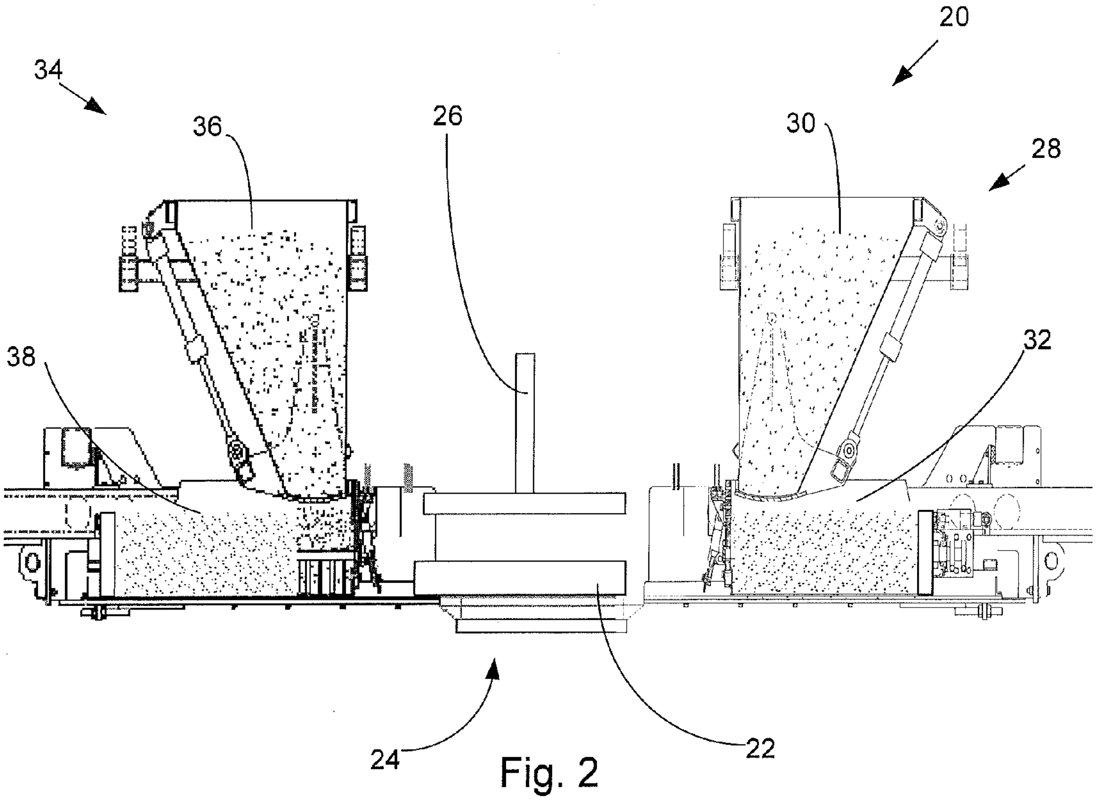
Fig. 2 (Prior Art)
FIGS. 2 and 2A are front views of a conventional color blending machine for forming paving stones as shown in FIG. 1.
Figure 2A:
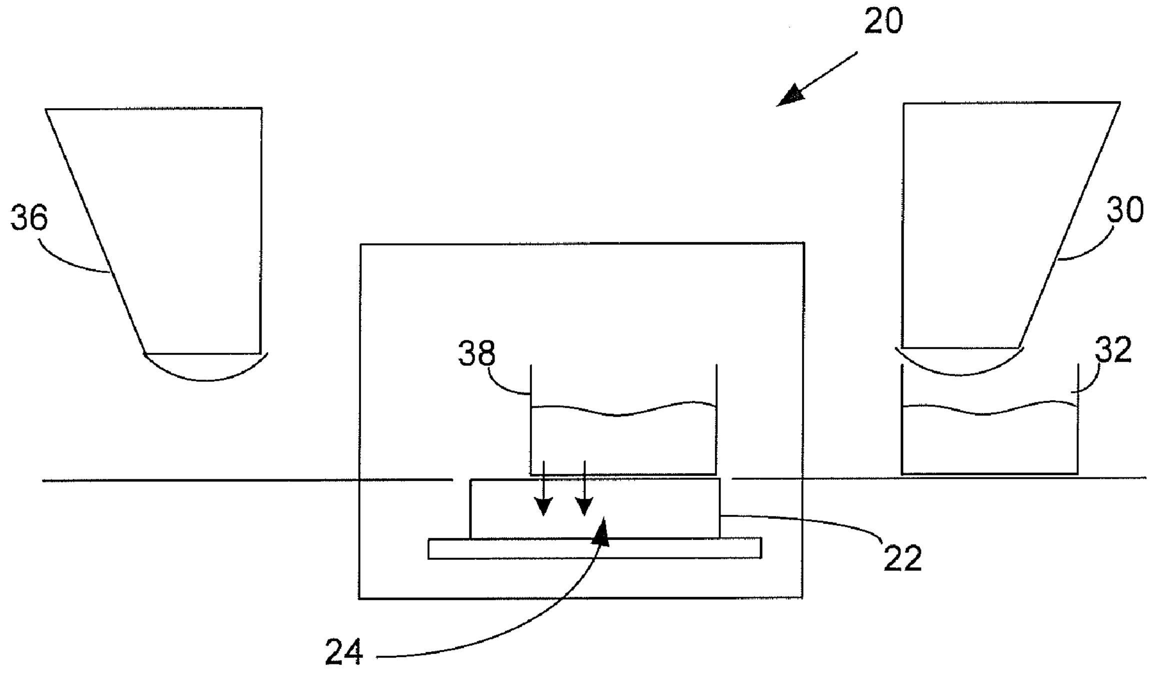
Fig. 2A (Prior Art)

Regarding configuration, prior art face mix hoppers have a trapezoid shape as shown in prior FIG. 2, such that the top of the face mix hopper has a relatively large area which tapers to a narrower area toward the bottom of the hopper. When concrete mix is drawn from such conventional hoppers, the tapered sidewalls cause mixing of the concrete mix. An analogous illustration is sand grains draining from an hourglass. As the sand grains funnel through the narrow opening, the sand grains mix.

Figure 8:
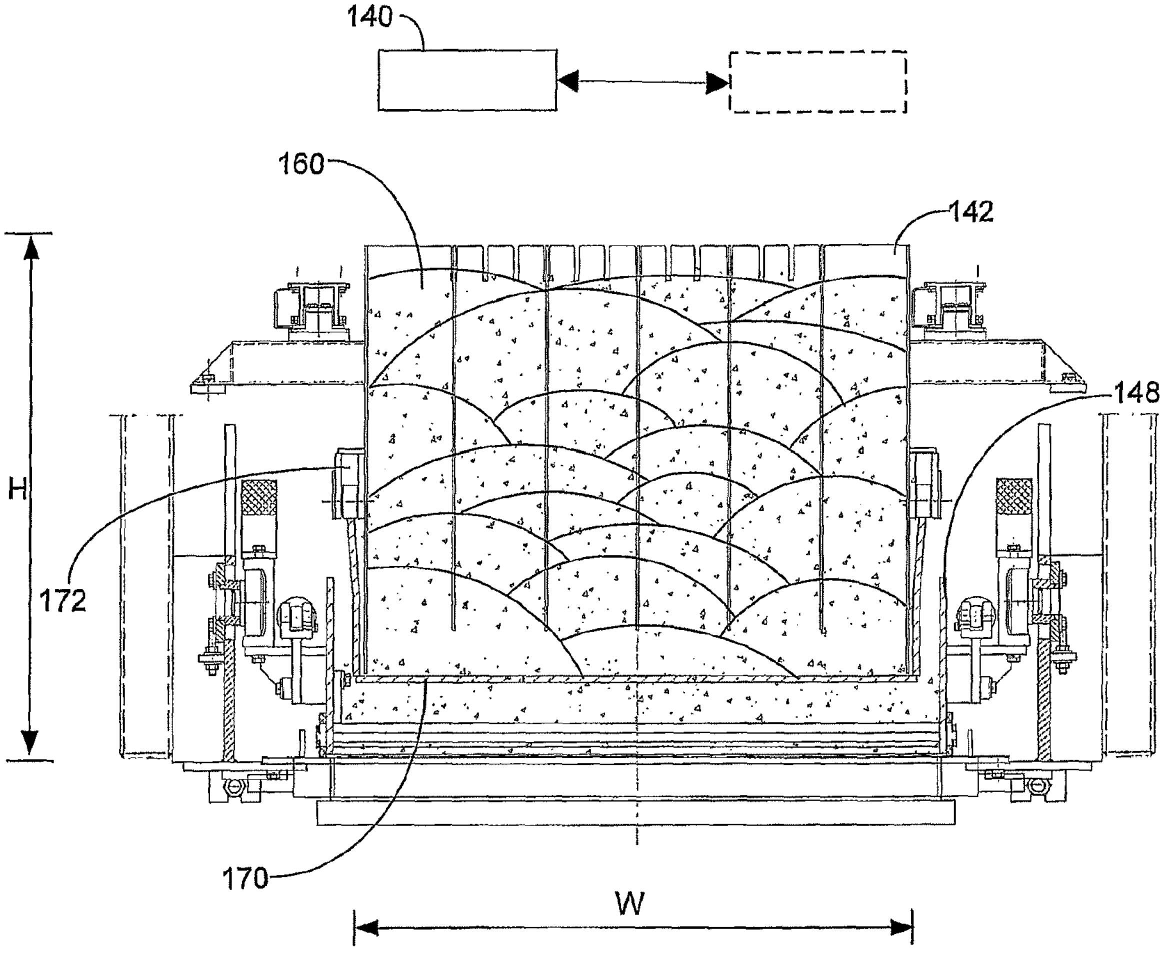
FIG. 8 is a front view of a face mix hopper and face mix feedbox according to the present invention.
Figure 9:
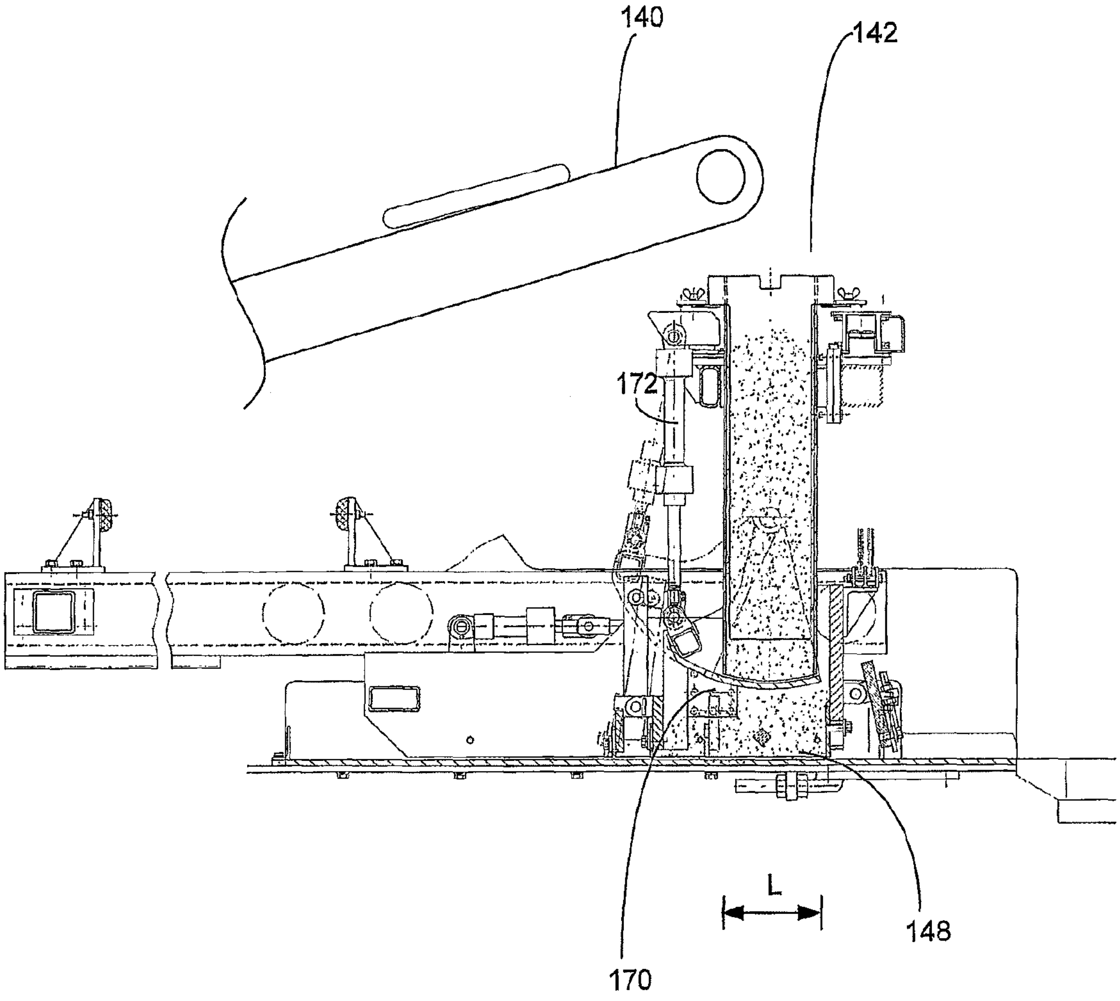
FIG. 9 is a side view of a face mix hopper and feedbox according to an embodiment of the present invention.
Figure 10A:
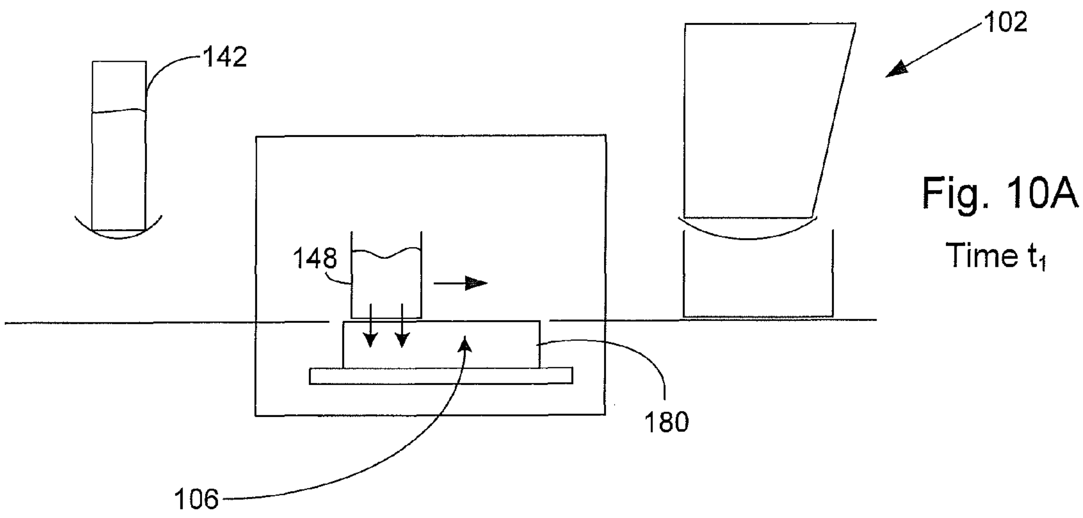
FIGS. 10A through 10C illustrate the position of a face mix feedbox according to the present invention depositing semi-dry concrete mix into a mold at three different times.
Figure 10B:
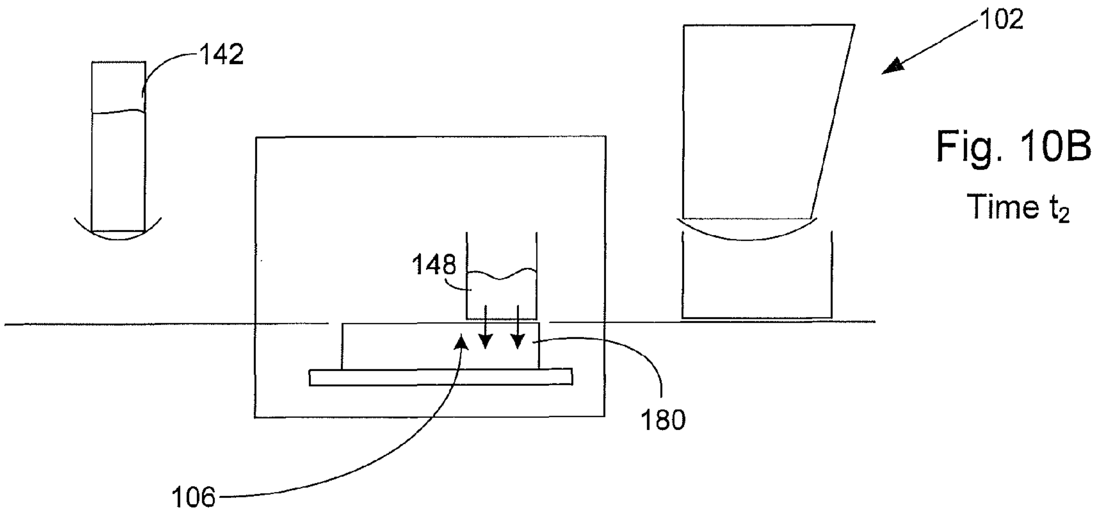
Figure 10C:
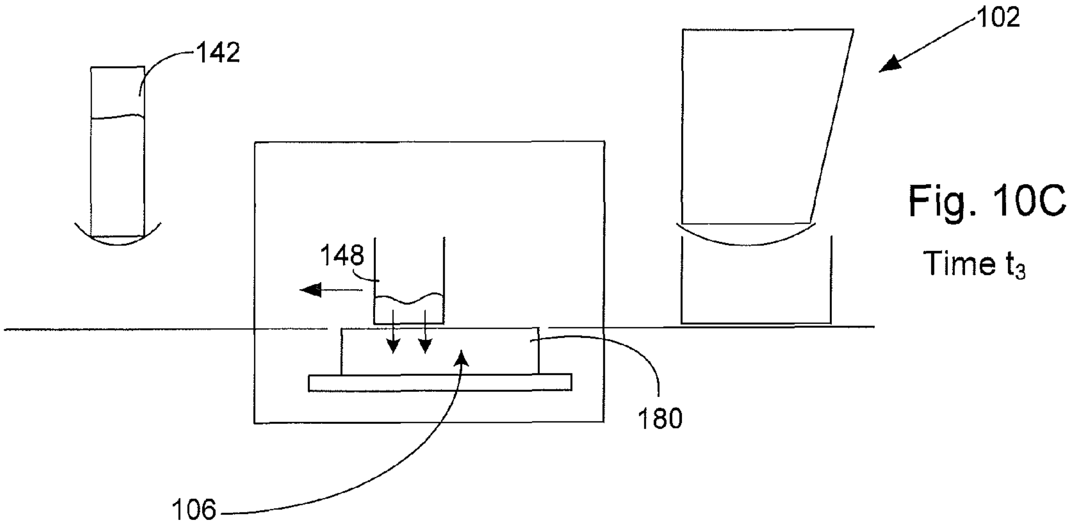

By contrast, as seen in FIGS. 8 and 9, the face mix hopper 142 has sidewalls that do not taper in embodiments of the invention. This straight wall, columnar design of the face mix hopper has a cross-sectional area that is constant along its entire height in embodiments. Thus, when gate 170 is actuated, an amount of semi-dry concrete mix falls straight down into the face mix feedbox 148, with little or no mixing.

Another feature contributing to the control of the composition of the concrete mix in the face mix feedbox is the size of the face mix hopper 142. The face mix hopper 142 has a relatively small size such as for example a height, H, of 800 mm, a length, L, of 210 mm, and a width, W, of about 1230 mm. This is approximately $\frac{1}{5}^{th}$ the volume of conventional face mix hoppers. For example, conventional face mix and coarse mix hoppers have volumes of approximately 1050 liters. In embodiments of the present invention, the face mix hopper 142 has a volume of about 240 liters. Having a small volume, concrete mix does not remain in the hopper 142 for long periods of time and the individual colors do not have the time to mix as they do in the prior art. It is understood that the volume of face mix hopper 142 may be greater or lesser than 240 liters in alternative embodiments. Similarly, the dimensions of the face mix hopper may vary from those set forth above in alternative embodiments.

Another feature of the present invention not found in the prior art is the size of the face mix feedbox, which further facilitates control over the distribution of the concrete mix deposited in the molds. The small length of the face mix hopper 142 allows the face mix feedbox 148 to have a smaller length as compared to prior art feedboxes. The overall dimensions of face mix feedbox 148 may be for example a height of 170 mm, a width of 1370 mm, and a length of about 400 mm. In embodiments, the face mix feedbox 148 may have a volume of approximately 83 liters to 124 liters. This is in comparison to prior art face mix feedboxes which have volumes of between about 295 liters to about 537 liters. Having a small volume, the concrete mix does not remain in the feedbox 148 for long periods of time and the individual colors do not have the time to mix as they do in the prior art.

With the above-defined dimensions, face mix feedbox 148 has a throughput of between approximately 2-5 cycles (i.e. a given batch of concrete mix will pass through the feedbox 148 in 2-5 cycles). A single cycle is defined as the travel of face mix feedbox 148 from its position beneath the face mix hopper into loading zone 106, where it deposits a layer of face mix semi-dry mix into a mold, and then the subsequent return of face mix feedbox 148 to its position beneath face mix hopper 142. The dimensions of the feedbox may vary from those set forth above in alternative embodiments. In embodiments, no blending takes place within the face mix hopper 142. In alternative embodiments, blending in the face mix hopper 142 may be provided by an agitator, rakes or vibration as is known in the art.

Features of the present invention include both the small size of the face mix hopper 142 and the small size of feedbox 148. The small size of both of these components prevents the degree mixing of the semi-dry concrete mix found in the prior art. The small size of both the hopper 142 and feedbox 148 allows the desired individual colors to be provided in the finished stone, in the desired amounts and in the desired relation to each other. As indicated above, the throughput from the feedbox 148 may be about 2-5 cycles. This is much quicker than in conventional face mix feedboxes, which as indicated in the prior art may be on average about 20 cycles.

It was not known in the prior art to provide a face mix hopper 142 or a feedbox 148 of the size used in the present invention. In particular, the prior art did not control the distribution of the concrete mix upstream of the face mix hopper to the degree found in the present invention. Therefore, even if smaller face mix hoppers and feedboxes were used on the face mix side in the prior art, they would not have provided for a better controlled distribution of face mix in the molds, because there was insufficient control of concrete mix going into the face mix hopper; without the upstream control of the concrete mix distribution, the advantages in control provided by smaller face mix hopper and feedbox are negated.

In fact, given the state of the art prior to the present invention, skilled artisans appreciated that bigger face mix hoppers and feedbox were more advantageous in that they did not have to be refilled as often as a smaller face mix hopper/feedbox. However, the controlled distribution of the concrete mix upstream of the face mix hopper and feedbox allowed the inventors of the present invention to add functionality to the face mix hopper and feedbox. By making them smaller, these components could now be used to control distribution of the semi-dry concrete mix in the molds to a greater degree possible than in the prior art. It was not until the controlled upstream distribution of the present invention that it was advantageous to provide a smaller face mix hopper and feedbox. Without a smaller face mix hopper and feedbox, the controlled upstream distribution of the semi-dry concrete mix provided by the present invention would to some degree be lost.

The face mix feedbox 148 may include a optical sensor, which, together with the known rate of transfer of the semi-dry concrete mix from the feedbox, may be used to signal the face mix hopper 142 that it is time to refill the face mix feedbox 148. Alternatively, the face mix hopper 142 may be controlled to refill the face mix feedbox 148 after a set number of cycles, for example, after 1, 2, 3, 4 or 5 cycles. It is understood that the number of cycles after which the feedbox is automatically refilled may be more than 5 in alternative embodiments.

Another advantage of the small length of the feedbox is that it allows all portions of the feedbox to pass over substantially the entire mold. In particular, referring now to FIGS. 10A-

10C, the face mix feedbox 148 is shown at three different times $T_1$, $T_2$ and $T_3$ as the face mix feedbox 148 travels over the mold 180 and back again. At a time $T_1$, the face mix feedbox 148 sweeps across the mold so that semi-dry concrete mix is distributed under the force of gravity into the mold through a (powered) agitator grid at the bottom surface of the face mix feedbox 148. As is known in the art, a vibratory force may also be applied to the face mix feedbox 148 to facilitate transfer of the semi-dry mix from the feedbox into the mold. The vibratory force may be omitted in alternative embodiments.

At a time $T_2$, the feedbox reaches the farthest portion of its stroke, and at a time $T_3$, the feedbox performs the return half of its stroke, continuing to distribute the semi-dry concrete mix from the feedbox into the mold under the force of gravity, and, if present, the vibratory force. Owing to the relatively small length of the face mix feedbox 148, the contents of the feedbox are distributed relatively evenly across the mold, so that even the portion of the mold farthest from the face mix feedbox 148 can receive semi-dry concrete mix from all portions of the feedbox.

Although the invention has been described in detail herein, it should be understood that the invention is not limited to the embodiments herein disclosed. Various changes, substitutions and modifications may be made to the disclosure by those skilled in the art without departing from the spirit or scope of the invention as described and defined by the appended claims.

We claim:

1. A color blending apparatus for blending different colored semi-dry concrete mixes together, the different color semi-dry concrete mixes being delivered to a mold from a feedbox, the feedbox moving over the mold in a reference direction, the apparatus comprising:

- a first conveyor;
- a plurality of dosing hoppers including a first dosing hopper for depositing an amount of a first colored semi-dry concrete mix on the first conveyor, and a second dosing hopper for depositing an amount of a second colored semi-dry concrete mix on the first conveyor in a controllably variable position relative to the first color semi-dry concrete mix deposited on the first conveyor;
- a second conveyor for receiving the amounts of the first and second color semi-dry concrete mixes from the first conveyor;
- a face mix hopper for delivering the different colored semi-dry concrete mixes to the feedbox, the second conveyor capable of controllably varying a placement of the first and second colored concrete semi-dry concrete mix in the face mix hopper in a direction generally perpendicular to the reference direction.

2. A color blending apparatus as recited in claim 1, wherein the plurality of dosing hoppers comprise six dosing hoppers for supplying up to six different colored semi-dry concrete mixes.

3. A color blending apparatus as recited in claim 1, wherein the feedbox cycles between a first position under the face mix hopper to receive a portion of the first and second colored semi-dry concrete mixes, and a second position over a mold to distribute the portion of the first and second colored semi-dry concrete mixes to the mold.

4. A color blending apparatus as recited in claim 3, the feedbox having a volume large enough to hold no more than five cycles worth of the semi-dry concrete mixes.

5. A color blending apparatus as recited in claim 1, the controllably variable positions in which the first and second colored semi-dry concrete mixes are supplied on the first conveyor comprise the first colored semi-dry concrete mix being spaced a controllable distance from the second colored semi-dry concrete mix, and the first colored semi-dry concrete mix partially or completely overlapping the second colored semi-dry concrete mix.

6. A color blending apparatus as recited in claim 1, the controllably variable positions at which the first and second different color semi-dry concrete mixes are distributed across the width of the face mix hopper by the second conveyor comprise a first end of the face mix hopper, a second end of the face mix hopper opposite the first end, and any position between the first and second ends.

7. A color blending apparatus as recited in claim 1, further comprising a first optical encoder for identifying a position of the first and second color semi-dry concrete mixes as the first and second color semi-dry concrete mixes move along the first conveyor.

8. A color blending apparatus as recited in claim 7, further comprising a second optical encoder for identifying a position of the first and second colored semi-dry concrete mixes as the first and second color semi-dry concrete mixes move along the second conveyor.

9. A color blending apparatus as recited in claim 1, the feedbox having a volume large enough to hold between two and five cycles worth of the semi-dry concrete mixes.

* * * * *